(12) United States Patent
Alattar et al.

(10) Patent No.: US 12,734,677 B2
(45) Date of Patent: Sep. 15, 2026

(54) CABLE-DRIVEN DEVICES AND SYSTEMS FOR PERFORMING SURFACE OPERATIONS

(71) Applicant: Dubai Future Foundation, Dubai (AE)

(72) Inventors: Ahmad Alattar, Dubai (AE); Tanzim Ahmed, Dubai (AE); Maitha Alqaydi, Dubai (AE); Erhamah Alsuwaidi, Dubai (AE); Omar Alhammadi, Dubai (AE); Yahya Al Hajj, Dubai (AE); Tarek Taha, Dubai (AE)

(73) Assignee: Dubai Future Foundation, Dubai (AE)

( * ) Notice: Subject to any disclaimer, the term of this patent is extended or adjusted under 35 U.S.C. 154(b) by 681 days.

(21) Appl. No.: 18/176,924

(22) Filed: Mar. 1, 2023

(65) Prior Publication Data

US 2023/0278194 A1 Sep. 7, 2023

Related U.S. Application Data

(60) Provisional application No. 63/419,034, filed on Oct. 25, 2022, provisional application No. 63/315,708, filed on Mar. 2, 2022.

(51) Int. Cl.
*B25J 9/00* (2006.01)
*B25J 5/00* (2006.01)
(Continued)

(52) U.S. Cl.
CPC ............ *B25J 9/0078* (2013.01); *B25J 5/007* (2013.01); *B25J 9/104* (2013.01); *E04G 23/002* (2013.01)

(58) Field of Classification Search
CPC .... B25J 9/0078; B25J 19/005; B25J 11/0085; B25J 9/10; B05C 1/08
(Continued)

(56) References Cited

U.S. PATENT DOCUMENTS 8,127,390 B2 3/2012 Kim
2021/0180351 A1* 6/2021 Lau ........................ B25J 9/0084

FOREIGN PATENT DOCUMENTS

CN 101518429 A * 9/2009
CN 201469194 U * 5/2010
(Continued)

OTHER PUBLICATIONS

United Arab Emirates Substantive Examination Report from related UAE Application No. P2024-02189, dated Dec. 12, 2025, 1 page.
(Continued)

*Primary Examiner* — Troy Chambers
(74) *Attorney, Agent, or Firm* — Tucker Ellis LLP; Ross M. Kowalski

(57) ABSTRACT

Devices, systems and methods of performing a surface operation on a building are provided. The device comprises a plurality of cables removably coupled to a surface of a building, tower or bridge, each of the plurality of cables removably coupled at a different position on the surface; and a body coupled to the plurality of cables at an intersection of the plurality of cables. A length of each cable between the respective position on the surface and the body is automatically adjustable and a tension in each cable is maintained to move the body on the surface. The devices, systems, and methods can be used on buildings, tower, or bridges with complex geometries or irregular surfaces to for example, automatically clean the surface of the building.

18 Claims, 13 Drawing Sheets

(51) Int. Cl.
*B25J 9/10* (2006.01)
*E04G 23/00* (2006.01)

(58) Field of Classification Search
USPC .......................................................... 104/112
See application file for complete search history.

(56) References Cited

FOREIGN PATENT DOCUMENTS

| | | | | | |
|---|---|---|---|---|---|
| CN | 106539536 | A | * | 3/2017 | .......... A47L 11/4066 |
| GB | 2548349 | A | * | 9/2017 | ............... A47L 3/02 |
| JP | 2009270321 | A | | 11/2009 | |
| JP | 2022134534 | A | * | 9/2022 | |
| KR | 2236366 | B1 | * | 4/2021 | |
| KR | 2021118534 | A | * | 10/2021 | |
| WO | WO-2019040975 | A1 | * | 3/2019 | ............. E04G 23/00 |
| WO | WO-2021176413 | A1 | * | 9/2021 | ............. B66C 21/00 |
| WO | WO-2023280943 | A1 | * | 1/2023 | .............. B25J 19/06 |

OTHER PUBLICATIONS

United Arab Emirates Search Report from related UAE Application No. P2024-02189, dated Oct. 31, 2025, 2 pages.

United Arab Emirates Office Action Summary Report from related UAE Application No. P2024-02189, dated Oct. 31, 2025, 7 pages.

* cited by examiner

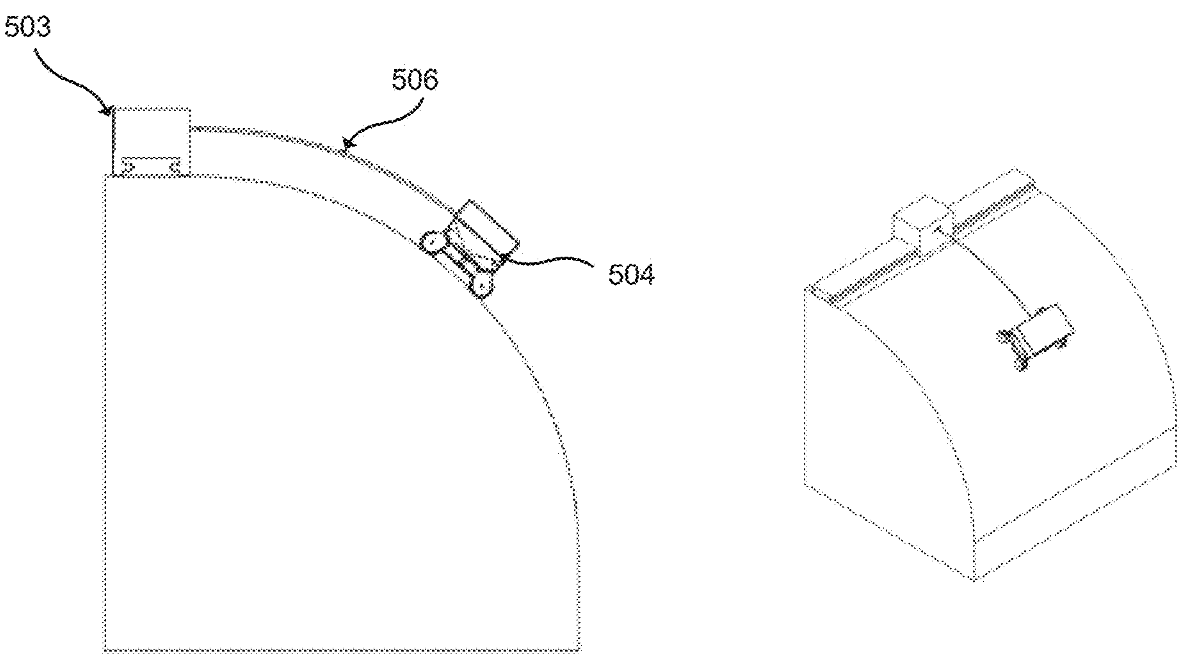
Figure 10a
Figure 10b
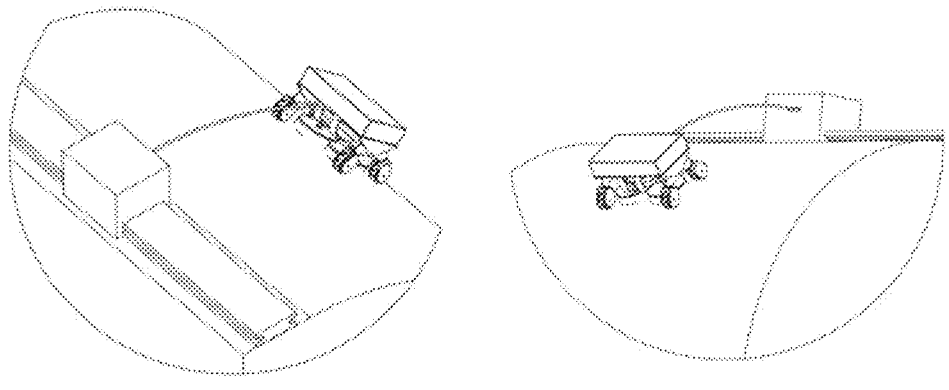
Figure 10c
Figure 10d

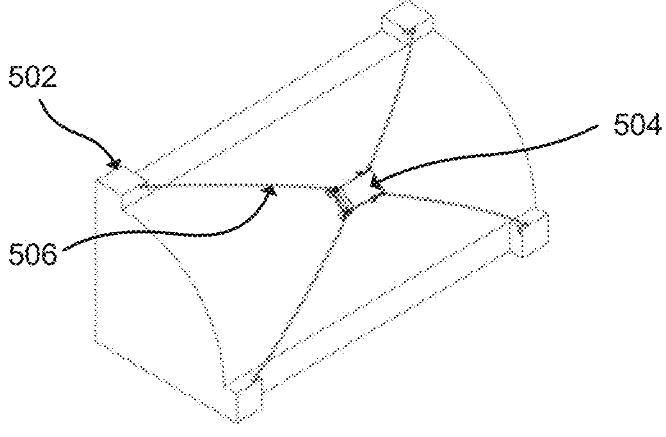
Figure 11a
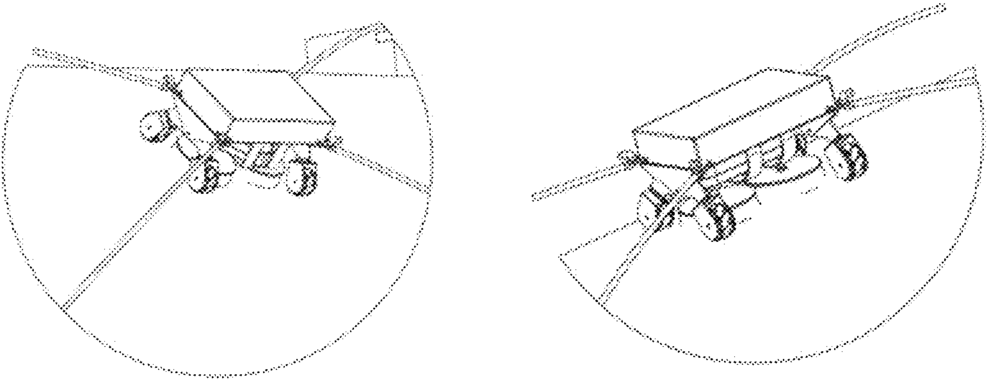
Figure 11b
Figure 11c

CABLE-DRIVEN DEVICES AND SYSTEMS FOR PERFORMING SURFACE OPERATIONS

CROSS-REFERENCE TO RELATED APPLICATIONS

This application claims priority to U.S. Ser. No. 63/315,708, entitled CABLE-DRIVEN SYSTEM FOR PERFORMING SURFACES OPERATIONS, filed Mar. 2, 2022, and claims priority to U.S. Ser. No. 63/419,034, entitled INTERNALLY-ACTUATED CABLE-DRIVEN PARALLEL ROBOT, filed Oct. 25, 2022, all of which are incorporated herein by reference.

FIELD OF INVENTION

The present disclosure relates to cable driven systems for performing services or operations, and in particular to cable driven robotic systems for performing services or operations on irregular surfaces or complex geometries, and/or on smaller surfaces or areas.

BACKGROUND

Spaces and surfaces of buildings, towers, and bridges require continuous maintenance and cleaning due to various environmental and weather conditions, and age factors. These spaces and surfaces may be restrictive and small, or may have complex shapes or geometries. In some cases, these buildings, towers, and bridges are cleaned manually by workers that are secured to the building or to other devices attached to or near the space or surface. This can be a time consuming and challenging task, requiring significant resources and posing potential hazards.

Robotic devices have been proposed for maintaining the surfaces and spaces of these buildings. There are some cable driven robotic systems, suction based robotic systems and aerial robotic systems that are normally manually operated. Some of these systems are autonomous, however these systems can only be used on planar surfaces, can be slow to perform the operation, and can be difficult and time consuming to set-up in smaller and more restrictive spaces.

Further, the existing robotic systems rely on gravity or planar surfaces to perform the operations. They cannot be used for irregular surfaces such as curved surfaces or surfaces with complex geometries.

Accordingly, an additional, alternative, and/or improved robotic system for performing services or operations in smaller or restrictive spaces and/or surfaces with complex shapes and geometries is desired.

SUMMARY

In accordance with one aspect of the present invention, there is provided a device for performing a service on a surface or in an area, the device comprising a plurality of cables removably coupled to a surface, each of the plurality of cables removably coupled at a different position on the surface; a body coupled to the plurality of cables at an intersection of the plurality of cables; and a plurality of pulley systems configured to automatically adjust a length of each cable of the plurality of cables between the respective position on the surface and the body such that a tension in each cable is maintained to move the body on the surface.

In the device, a number of the plurality of cables may be determined based on a geometry of the surface.

In the device, the plurality of pulley systems may be positioned within the body and each cable of the plurality of cables may be coupled to a respective pulley system of the plurality of pulley systems.

In the device, each pulley system of the plurality of pulley systems may be positioned at the respective position on the surface and each cable of the plurality of cables may be coupled to a respective pulley system.

In the device, each pulley system of the plurality of pulley systems comprises a motor and a pulley, the pulley being configured to adjust the length between the respective position on the surface and the body.

In the device, the body comprises an attachment for performing the service.

The device may further comprise circuitry configured to: automatically adjust the length of each cable of the plurality of cables between the respective position on the surface and the body to move the body on the surface or in the area; and maintain the tension in each of the plurality of cables to maintain a position of the body relative to the surface.

In the device, the body may further comprise: wheels for moving the body on the surface; and a suspension system for the wheels for moving the body across irregularities on the surface.

In the device, the surface is a curved surface or has complex geometry.

In accordance with another aspect of the present invention, there is provided a device for performing a service on a surface or in an area, the device comprising: at least one cable removably coupled to a surface, each of the at least one cable removably coupled at a different position on the surface; a body coupled to the at least cable and in contact with the surface; and at least one pulley system configured to automatically adjust a length of each of the at least one cable between the respective position on the surface and the body such that a tension in each of the at least one cable is maintained to move the body on the surface.

The device may comprise one cable coupled to the surface via a guide unit, the guide unit comprising one pulley system, and the cable being coupled to a pulley of the pulley system.

The device may further comprise an elongated member for guiding the guide unit across the surface, the guide unit being slidably coupled to the elongated member.

The device may further comprise circuitry configured to: automatically adjust the length of the cable between the elongated member and the body to move the body on the surface; and actuate a motor of the guide to move the guide unit along the elongated member.

In the device, the body comprises an attachment for performing the service.

In accordance with another aspect of the present invention, there is provided a system for performing a service in a space or on a surface, the system comprising: a cable driven device and a processor. The cable driven device comprising: a plurality of cables configured to removably couple to a surface, each of the plurality of cables configured to removably couple to the surface at a different position on the surface; and a body configured to perform the service and coupled to the plurality of cables at an intersection of the plurality of cables. The processor being configured to: automatically adjust a length of each cable of the plurality of cables between the respective position on the surface and the body; and maintain a tension in each cable of the plurality of cables.

In accordance with another aspect of the invention, there is provided a method of performing a service in a space or on a surface, the method comprising: providing a model of the space or the surface; generating one or more placements of a cable driven device in the space or on the surface, and for each placement creating a surface coverage plan; performing, by the cable driven device, the service based on the coverage plan of the one or more surfaces; and during the performing, automatically adjusting a length of cables of the cable driven device and maintaining a tension in the cables of the cable driven device.

The cable driven device comprises a body for performing the service, the cables for connecting to the surface and to the body, and pulley systems for adjusting the length of the cables and maintaining the tension in the cables.

The method may further comprise receiving signals from a controller, the signals indicating an adjustment of each of the cables.

In the method, the surface coverage plan is generated based on at least one of a force of the body on the surface for the service, a tension in each of the cables to maintain the body away from the surface, and an attachment on the body for performing the service.

BRIEF DESCRIPTION OF THE DRAWINGS

Further features and advantages of the present disclosure will become apparent from the following detailed description, taken in combination with the appended drawings, in which:

FIGS. 10*a*-10*d* depict an externally actuated uni-cable driven device positioned over curved surfaces;

FIGS. 11*a*-11*c* depict an externally actuated multi-cable driven device positioned over curved surfaces;

DETAILED DESCRIPTION

Devices, systems and methods of performing a service or operation on a building, tower or bridge are provided. The device and system comprises a plurality of cables removably coupled to a surface of a building, tower or bridge, each of the plurality of cables removably coupled at a different position on the surface, and a body in contact with the surface or present in an area and coupled to the plurality of cables at an intersection of the plurality of cables. A length between each of the plurality of cables and the body is automatically adjustable at the removable connections or at the body and a tension in each of the plurality of cables is maintained to move the body on the surface or in the area. The devices, systems, and methods can be used on buildings, towers and bridges with complex geometries or irregular surfaces to for example, automatically clean the surface of the building, tower or bridge.

Figure 1:
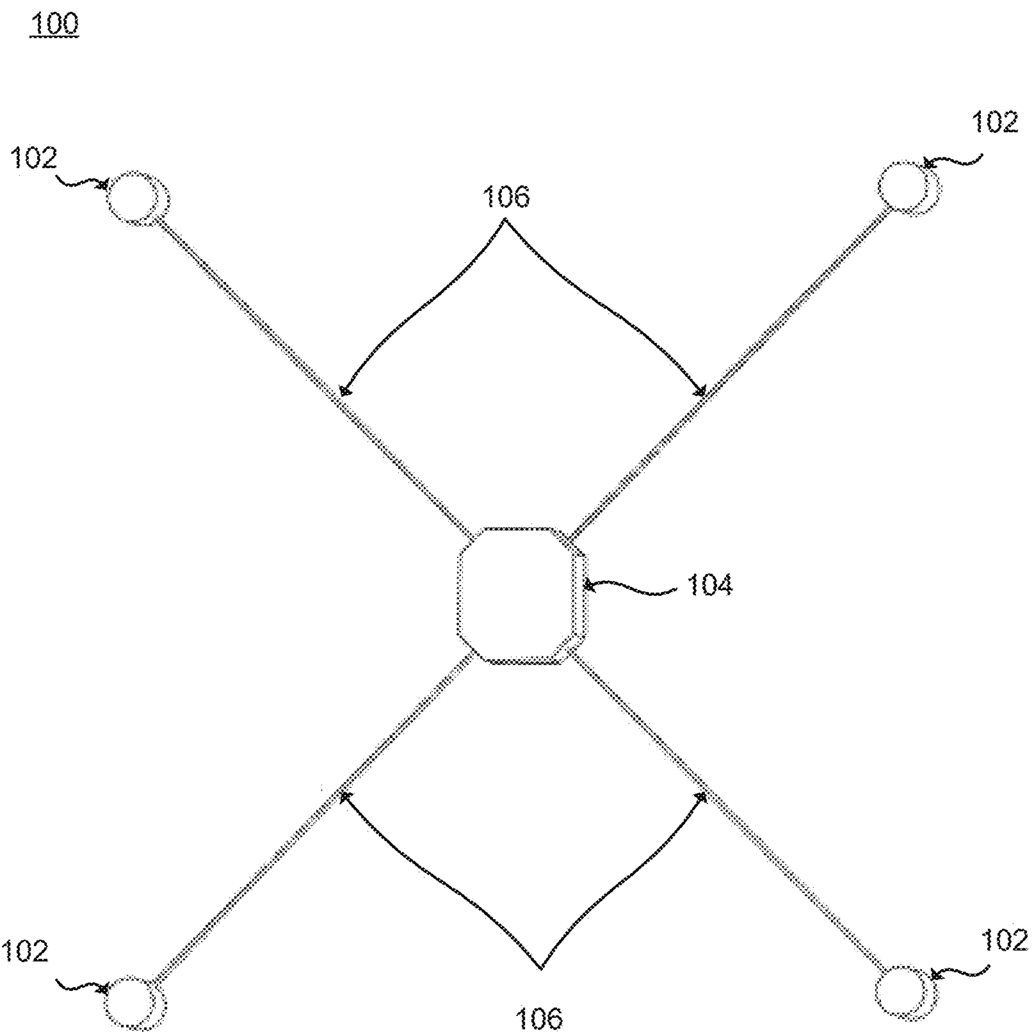
FIG. 1 depicts an embodiment of a cable-driven device.

FIG. 1 depicts an embodiment of a cable-driven device 100. The cable-driven device 100 is a robotic cable-driven parallel system that may be used on buildings, towers, and bridges. The cable driven device 100 comprises a body or end-effector 104 and a plurality of cables 106. The plurality of cables 106 are each connected to the body 104 and are configured to removably connect or couple to one or more surfaces. The connection between each of the plurality of cables and the body 104 may be a rigid connection or a pivoting connection.

A length of each of the cables 106 is configured to be adjusted such that the body 104 can move in the space or on the surface. The adjustment of the length of the cables is done by winches or pulley systems within the body (internally actuated cable driven system) or at the one or more connection points 102 (externally actuated cable driven system).

Figure 2B:
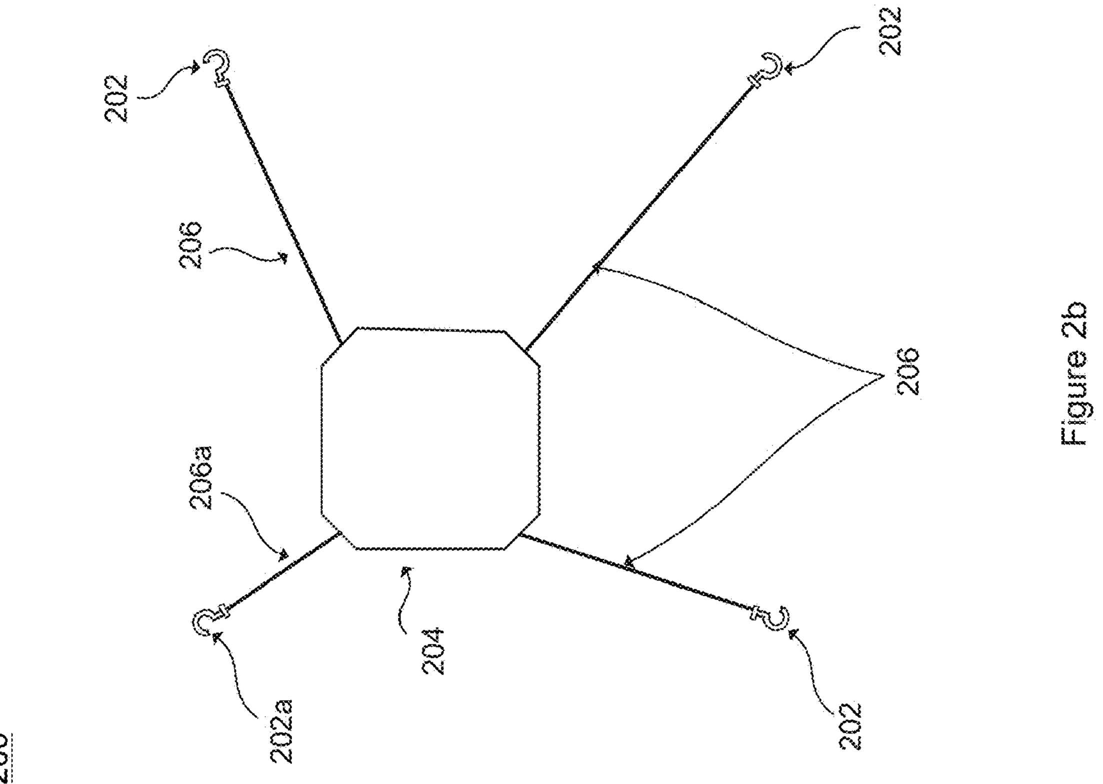
FIGS. 2*a* and 2*b* depicts an embodiment of an internally actuated cable-driven device.
Figure 2A:
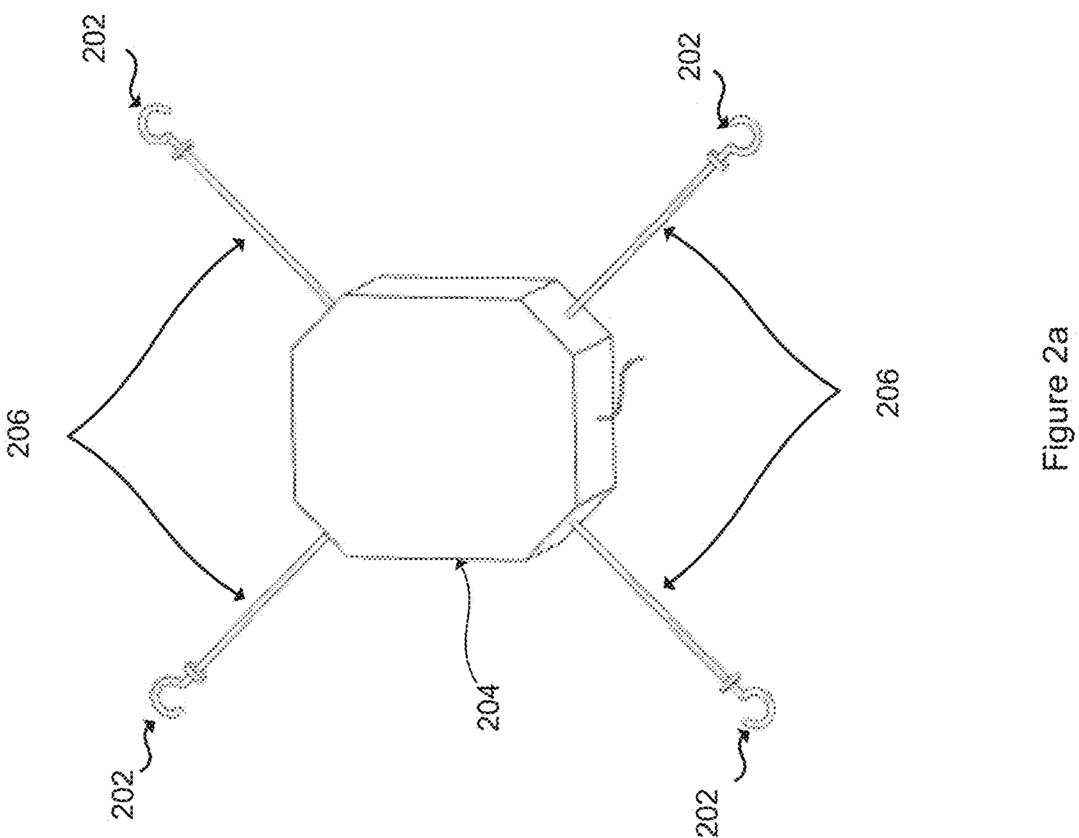

FIGS. 2*a* and 2*b* depicts an embodiment of an internally actuated cable-driven device 200. The cable-driven device 200 comprises connection points 202, a body or end effector 204, and a plurality of cables 206. Each of the plurality of cables 206 connects to the body 204 and removably connects to a surface or in a space via the connections 202. As depicted in FIG. 2*a*, the connections 202 may be removably connected at particular anchor points on a surface, and/or on other surfaces. Although four connections are depicted, it will be appreciated that there may be more or less connections and cables on the device to allow for more accurate services to be performed by the device, depending on the application and services being performed by the device.

The connections 202 removably attach to the surface or in the space at permanent or temporary fixtures or supports. The fixtures may be fixtures specifically for the cable-driven device 200 or the fixtures may be different features already present on the surface or in the space. The fixtures may be positioned or selected by a user at particular points on the surface or in the space so that the body 204 can perform a service on the area between the fixtures The cable-driven device 200 is configured to adjust the length of each of the cables 206, between the connections 202 and the body 204, so that the body 204 can be moved within the area between the fixtures and perform the service on the area. For example, as depicted in FIG. 2*b*, if a length of one of the cables 206*a* is shortened, the body 204 is moved closer to the connection 202*a*, to which the cable 206*a* is coupled to. It will be appreciated that as the length of one of the cables, for example cable 206*a*, is shortened, the lengths of the remaining cables may be adjusted accordingly, to maintain tension in the cables.

To actuate the body 204 on the surface or in the space, the cable driven device 200 comprises an actuator for each of the plurality of cables 206. The actuators are configured to adjust the lengths of each of the cables 206 between the body 204 and each of the connections 202. The actuators are positioned at or within the body 204.

Figure 3A:
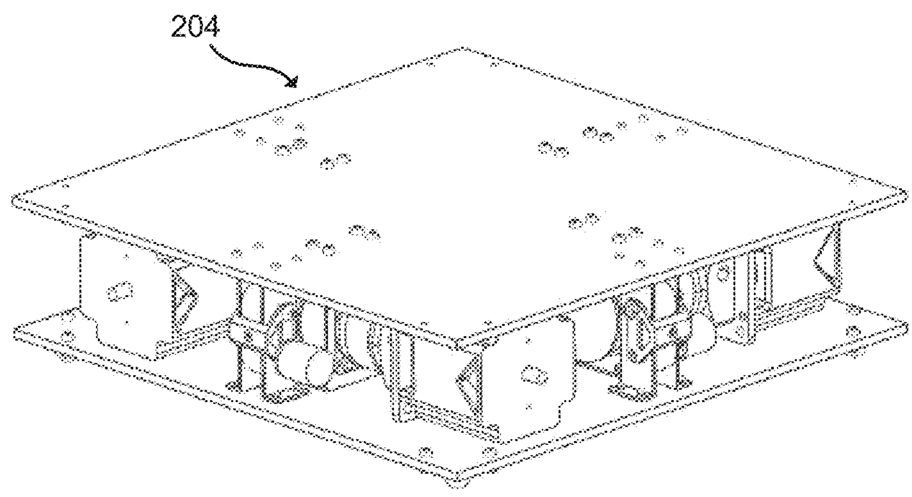
FIG. 3*a* depicts an embodiment of a body of the internally actuated cable-driven device.
Figure 3B:
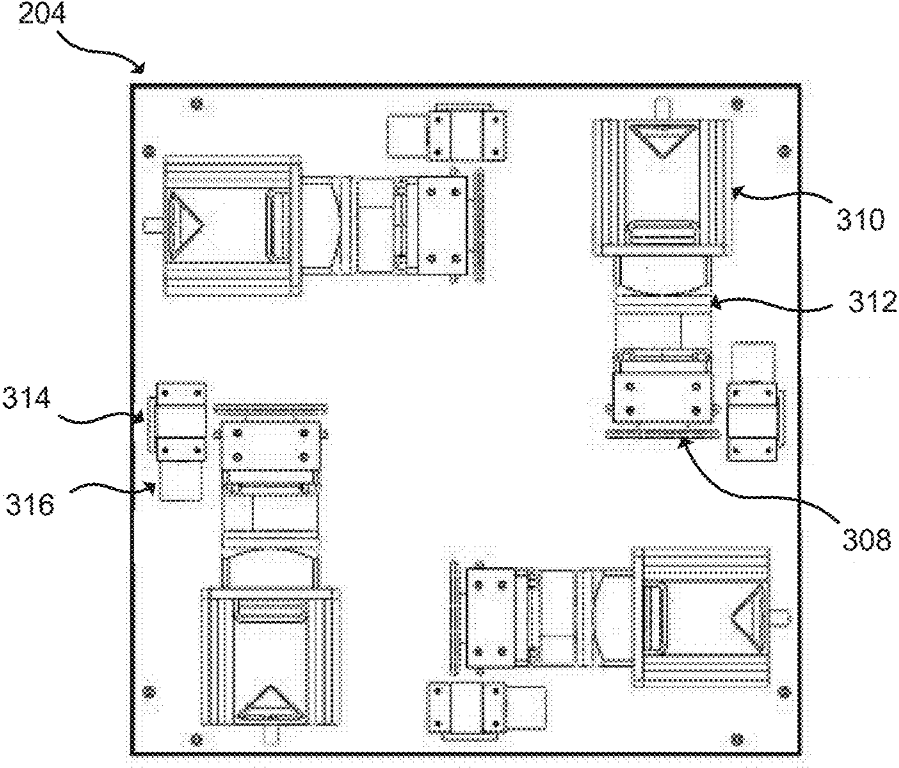
FIG. 3*b* depicts an embodiment of the components of the body.

FIG. 3*a* depicts an embodiment of the body 204, and FIG. 3*b* depicts an embodiment of the components of the body 204. The cable-driven device 200 comprises a control PC, actuators, and cables 206. The cables 206 are connected to the body 204 via a pulley 308 or other similar mechanism in the body 204. The control PC may be a microcontroller that is configured to send control signals to motor drivers which actuate motors 310. The motors 310 are configured to rotate the pulley 308 via, for example a gear box 312, such that the lengths of each of the cables 206 may be shortened or lengthened. It will be appreciated that a motor 310 in combination with a pulley 308 is referred to herein as a winch. Each cable's 206 length is adjusted by a winch, which allows for the body 204 to move closer to or further from particular connections 202, while maintaining tension in the cables 206. It will be appreciated that instead of a winch, the device may comprise another mechanism for adjusting the length of the cables. The device 200 may further comprise additional pulleys or winches to twist the cables to allow for finer movements of the body 204 in the area or on the surface.

The cable-driven device 200 further comprises a power supply. The power may be internally supplied through a battery, or externally supplied through a power cable. In embodiments where the power is supplied through a power cable, the weight of the cable-driven device may be reduced. It will be appreciated that the internal-actuation configuration of the cable-driven device 200 may increase the weight of the device, which may make the device more suitable for smaller payloads. It will be further appreciated that this allows for the device 200 to be used where there is very limited space to setup, when flexibility over the space is required, or when having weight is beneficial in the application (e.g. applications that require tangential force on a surface).

Figure 4:
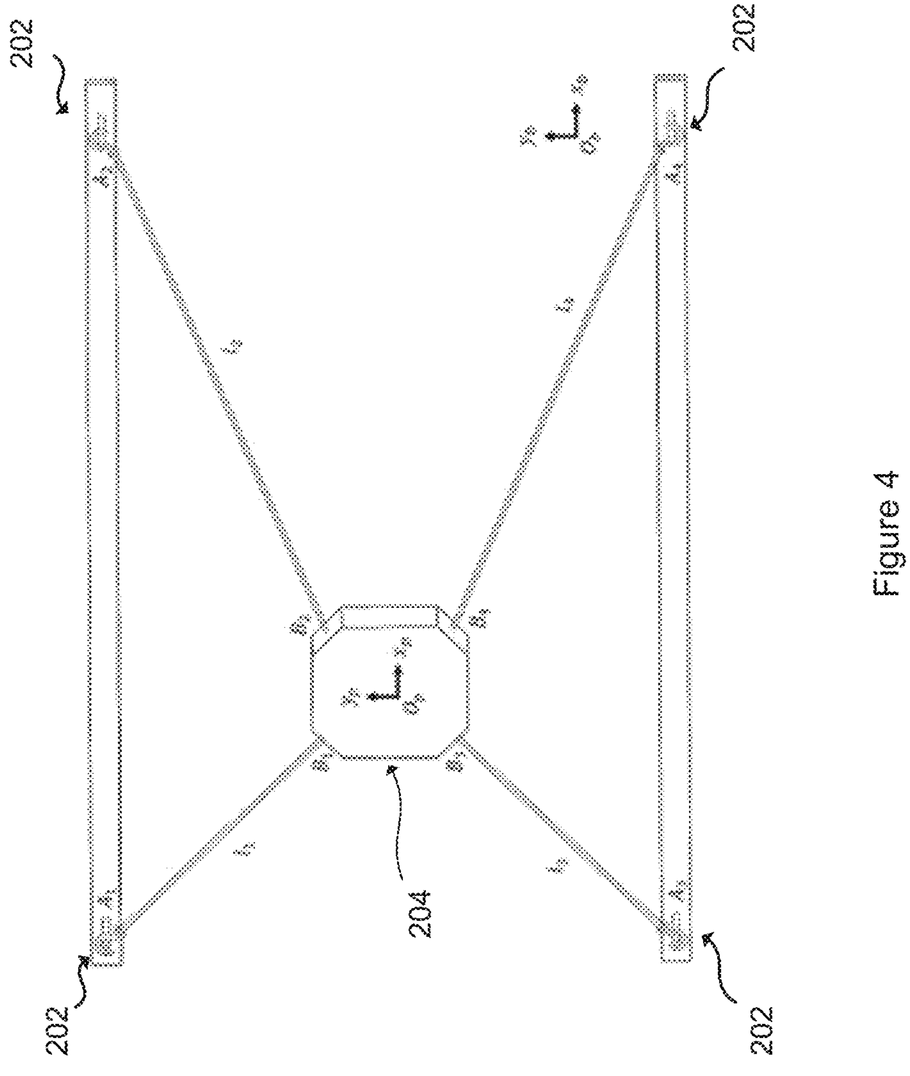
FIG. 4 depicts a system of the internally actuated cable-driven device.

FIG. 4 depicts a system of the cable-driven device 200. The control PC of the cable-driven device 200 may store a program for controlling the device 200, or the device 200 may be configured to receive signals from an off-board controller in, for example an external PC, for controlling the device 200. The control system is configured to move the body 204 within an area such that a service can be performed in the space or on the surface where the cable-driven device 200 has been positioned.

The signals from the off-board controller or the stored program are configured to cause the microcontroller to send actuation signals to the motor drivers to actuate the motors 310. The signals or the program may cause the motors 310 to actuate to apply an appropriate tension or force on the cables 206 and, in some embodiments, to apply an appropriate pressure to the surface for a particular service or application of the body 204. It will be appreciated that attachments for different services or applications, such as cleaning attachments, painting attachments, or camera attachments may be attached to the body 204 to perform the service.

The off-board controller, or the control PC, uses sensor readings obtained by the device or by an external system or device, and inverse kinematics and dynamics to calculate the required actuation signals to move the device from one point to another. The sensor readings may be the lengths of each of the cables, the angles of each of the cables, the distance of the device from a surface and other readings for the device.

A model of the surface or space for the service may be uploaded to the control PC or the off-board controller, to allow for a user to specify the areas for the service on the model. The control system can monitor and store information about the progress of the service as it is performed.

An adaptive control method may be used to move the body 204 in the space or on the surface. In such embodiments, the system is calibrated prior to any services being performed by the device 200. The calibration may be done using limit switches. The calibration cycle comprises maintaining tension on all cables 206 whilst actuating one cable at a time. This allows for each cable length to be measured. In addition, the angles of the cables 206 relative to one or more axes of the body 204 may be determined. To determine the cable angles, guiding systems or pulleys 314 attached to encoders 316 may be used. The guiding systems 314 and encoders 316 may be part of the system to provide more accurate measurements of the cable lengths. As depicted in FIG. 3*b*, each winch and cable 206 may have its own guiding system 314 and encoder 316. It will be appreciated that in some embodiments, an external motion capture system may instead be used for determining the position of the device 200 in the area.

Once calibration is complete, the external PC or the program determines how to mobilise the body 204 by actuating each of the cables 206 independently to achieve the motion. To maintain tension on all cables, a system model may be used based on a parallel cable mechanism to move all the cables proportionally to achieve the desired motion.

Referring to FIG. 4, the position and orientation of the device 200 is given by vector $[p, \theta]^T$ which is relative to $F_b$, where $p=[p_x, p_y, p_z]$ and $\theta=[\alpha, \beta, \gamma]$. It will be appreciated that the cable lengths vector is $l=[l_1, l_2, l_3, \ldots, l_m]$ and the cable tensions vector is $\tau=[\tau_1, \tau_2, \tau_3, \ldots, l_m]$, where m is the total number of cables.

The base frame is denoted as $F_b$, which is attached to the base of a rigid structure (such as a building surface), and the moving platform frame is denoted as $F_b$, which is attached to the device, shown with origins $O_b$ and $O_p$, respectively. The connections 202, between the cables 206 and the rigid structure (for example, the fixtures), are denoted as $A_i$. These connection points are fixed relative to the base frame. The connection points between the cables 206 and the body 204 are denoted as $B_i$ which are a fixed distance away from $F_p$. Vector $$a_i^b$$

represents the position vector of point $A_i$ expressed in the base frame, and vector $$b_i^p$$

is the position vector or point $B_i$ expressed in the device's frame. Although the z-axis is not depicted in FIG. 4, it will be appreciated that in embodiments where the device is connected to fixtures on more than one surface, the device 200 may be moved in the x-, y-, and/or z-axis.

Prior to any actuation by the device, the connections 202 are anchored to the fixtures in the environment. The change in cable lengths by the winches displaces the device about the area.

The program for controlling the device, or the signals from the off-board controller may be configured to generate a surface coverage plan for each surface or space for the service to be performed. The coverage plan may be used to systematically navigate the area of the surface or space to cover every part of it according to predefined parameters. The predefined parameters may be the required force of the body 204 on the surface, the tension in the cables 206, etc. The coverage plan is executed, to move the body over the surface or in the space to ensure proper coverage. Once service for the area is completed, the cable driven device may be moved to a new or next surface or space where another set of fixtures is present, to cover all areas of interest on the surface or in the space. When the device is moved to the next area, a surface coverage plan may be created for said next area and then executed.

Figure 5B:
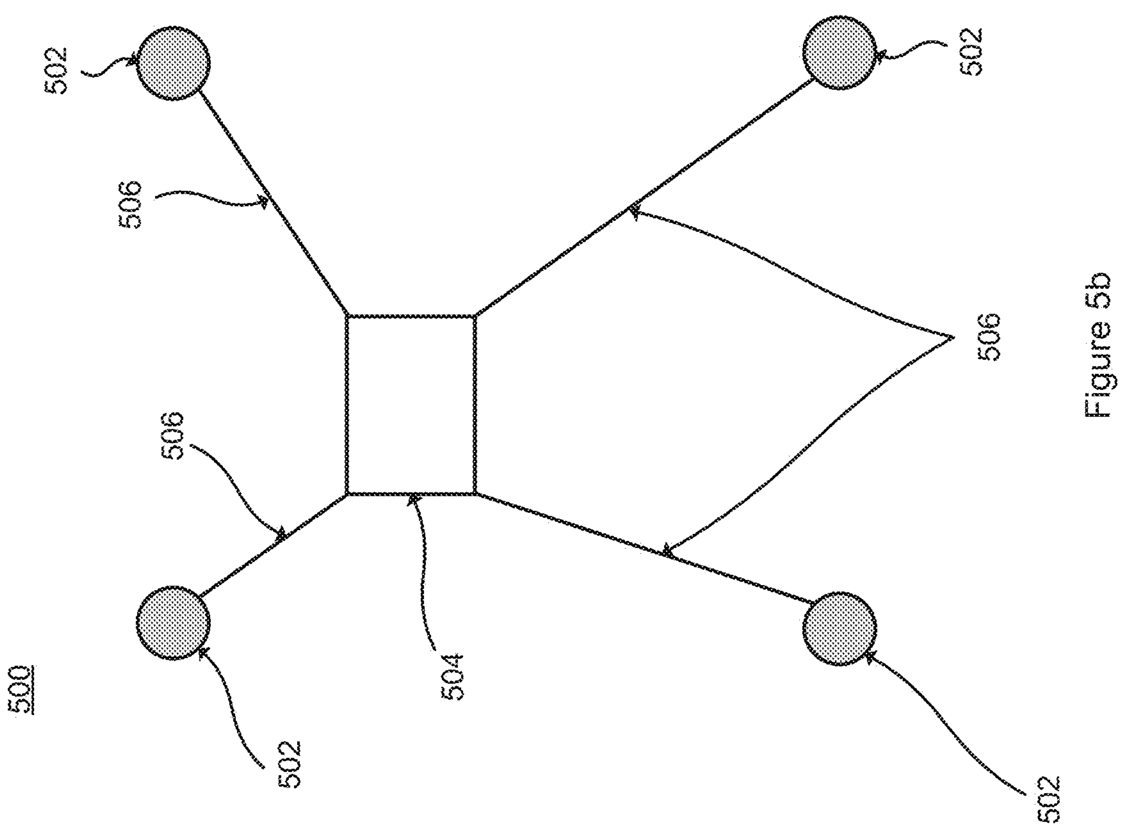
FIGS. 5*a* and 5*b* depict embodiments of externally actuated cable-driven devices.
Figure 5A:
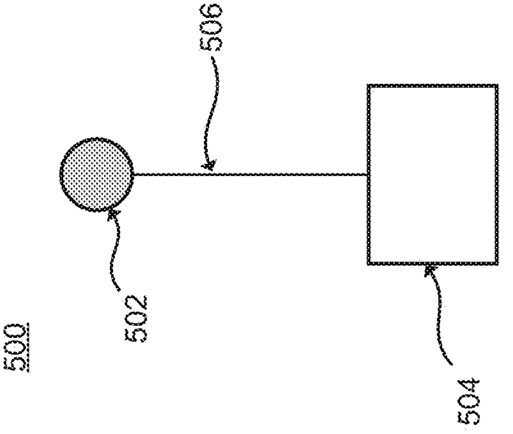

FIGS. 5*a* and 5*b* depict embodiments of externally actuated cable-driven devices 500. The externally actuated devices 500 comprise connection points 502, a body 504, and cables 506 similar to the internally actuated device 200. As depicted in FIG. 5*a*, the device 500 may be uni-cable driven, or as depicted in FIG. 5*b*, the device 500 may be multi-cable driven. As similarly described above for device 200, the device 500 may comprise more or less cables 506 and connection points 502 than depicted depending on the service or operation to be performed by the device.

Each of the cables 506 are configured to be adjusted by guiding systems at the connection points 502. The guiding systems removably attach to the surface or in the space at permanent or temporary fixtures or supports. For example, the guiding systems may removably connect to particular anchor points already present on a building, tower, or bridge, or anchor points may be added to a building, tower, or bridge for the guiding systems to removably connect to. As with the device 200, a user may customize the placement of the fixtures for various applications of the device 500.

The fixtures are placed at particular points on the surface or in the space so that the body 504 can perform a service or operation on the area between the fixtures. It will be appreciated that the uni-cable driven device 500 may only have one fixture to connect to, such that the body 504 is moved closer to or away from the connection point 502 to perform the service or operation.

The guiding systems at the connection points 502 are configured to shorten or lengthen the length of each of the cables 506, between the connection point 502 and the body 504, so that the body 504 can be moved and perform the surface operation on the area between the fixtures. It will be appreciated that as the length of one of the cables is shortened, the lengths of the remaining cables may be adjusted accordingly, to maintain tension in the cables and pressure on the surface from the body 504 depending on the application of the device 500.

Figure 6:
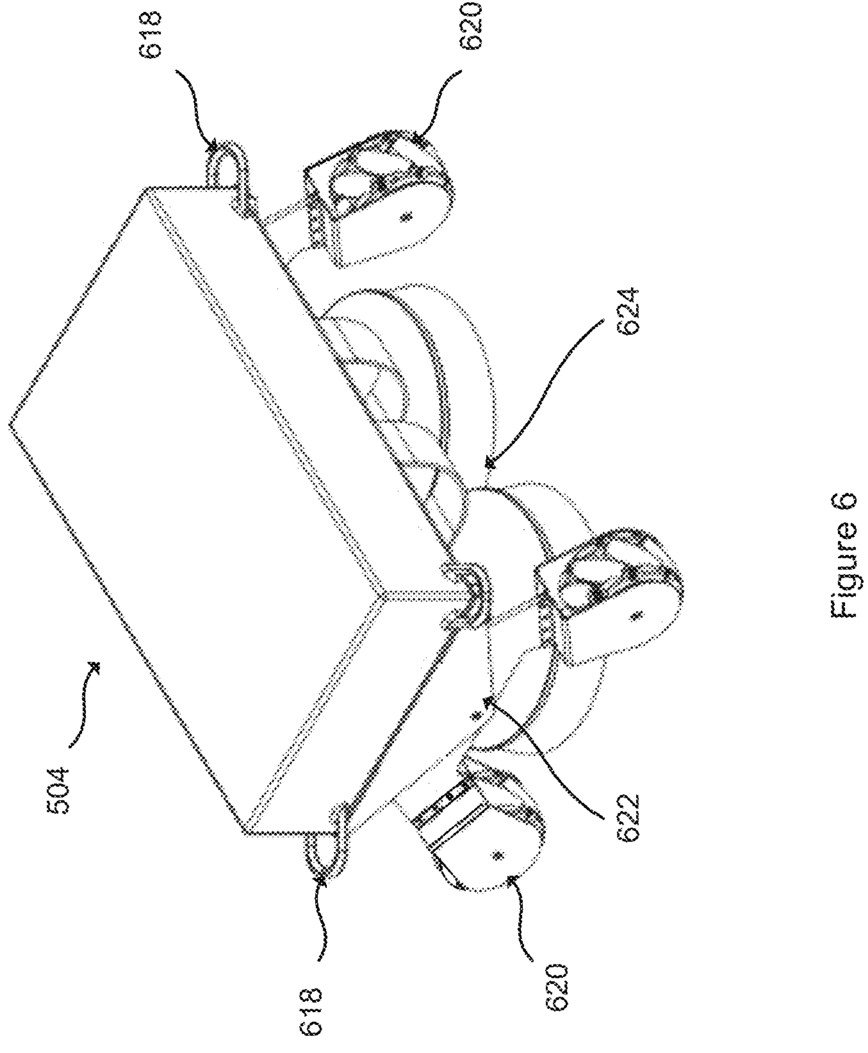
FIG. 6 depicts an embodiment of a body of the externally actuated cable driven devices.

FIG. 6 depicts an embodiment of the body 504 of the externally actuated cable driven device 500. It will be appreciated that the actuators are located outside of the body 504 the device 500. To support and stabilise the device, the body 504 comprises a fixed platform. This allows for the device 500 to move along curved surfaces with good control and stability. The body 504 comprises anchor points 618 for the cables 506 to removably connect to, and a support system to support the body 504 and to allow for the body to move across a surface. It will be appreciated that there may be more or less anchor points 618 depending on the number of cables 506. The support system may comprise wheels 620 and a suspension 622. The wheels 620 may be mecanum wheels, and the suspension 622 may be a rocker-bogie suspension that allows the body 504 to move across curved or irregular surfaces. It will be appreciated that although a suspension system and wheels are depicted, another fixed platform that provides stability and good control of the device 500 may instead be used.

The body 504 further comprises an attachment 624 similar to device 200. The attachment 624 may removably connect to or be permanently attached to the body 504. It will be appreciated that the attachment may be particular for different services or applications, such as a cleaning attachment, a painting attachment, or a camera attachment.

The externally actuated cable driven device 500 comprises a control PC, motor drivers, and winches to adjust the length of the cables 506 and move the body 504. The motor drivers and winches are within the guiding systems at the connections points 502. The cable-driven device 500 further comprises a power supply. The power may be internally supplied through a battery, or externally supplied through a power cable. In embodiments where the power is supplied through a power cable, the weight of the cable-driven device may be reduced. It will be appreciated that as the winches and power may be located outside of the body 504, the overall size of the device 500 may be reduced. The device 500 may be used for applications that require significant force on a surface as there may not be any heavy internal components.

Figure 7:
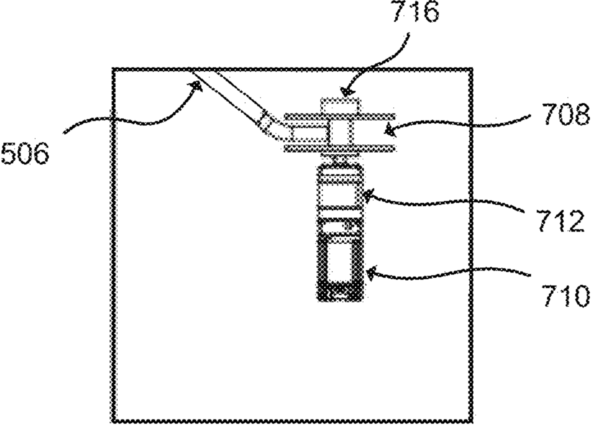
FIG. 7 depicts an embodiment of the guiding system of the externally actuated cable driven devices.

FIG. 7 depicts an embodiment of the guiding system. The cables 506 are connected to the guiding system via a pulley 708 or other similar mechanism in the guiding system. The control PC may be a microcontroller that is configured to send control signals to motor drivers which actuate motors 710. The motors 710 are configured to rotate the pulley 708 via, for example a gear box 712, such that the lengths of each of the cables 506 may be shortened or lengthened. Each cable's 506 length is adjusted by a winch (motor 710 and pulley 708), which allows for the body 504 to move closer to or further from particular connections 502, while maintaining tension in the cables 506. It will be appreciated that instead of a winch, the device may comprise another mechanism for adjusting the length of the cables.

The pulleys 708, motors 710, and cables 506 mobilise the body 504 using a control algorithm to maintain the tension of the cables 506 and a pressure of the body 504 on the surface. It will be appreciated that in an embodiment, the pulleys 708 may be winches controlled by servo motors to vary the length between the body 504 and the cables 506. There may be additional pulleys or winches to twist the cables connected to the body 504. This may allow for finer movements of the body 504 in the area or on the surface.

Figure 8:
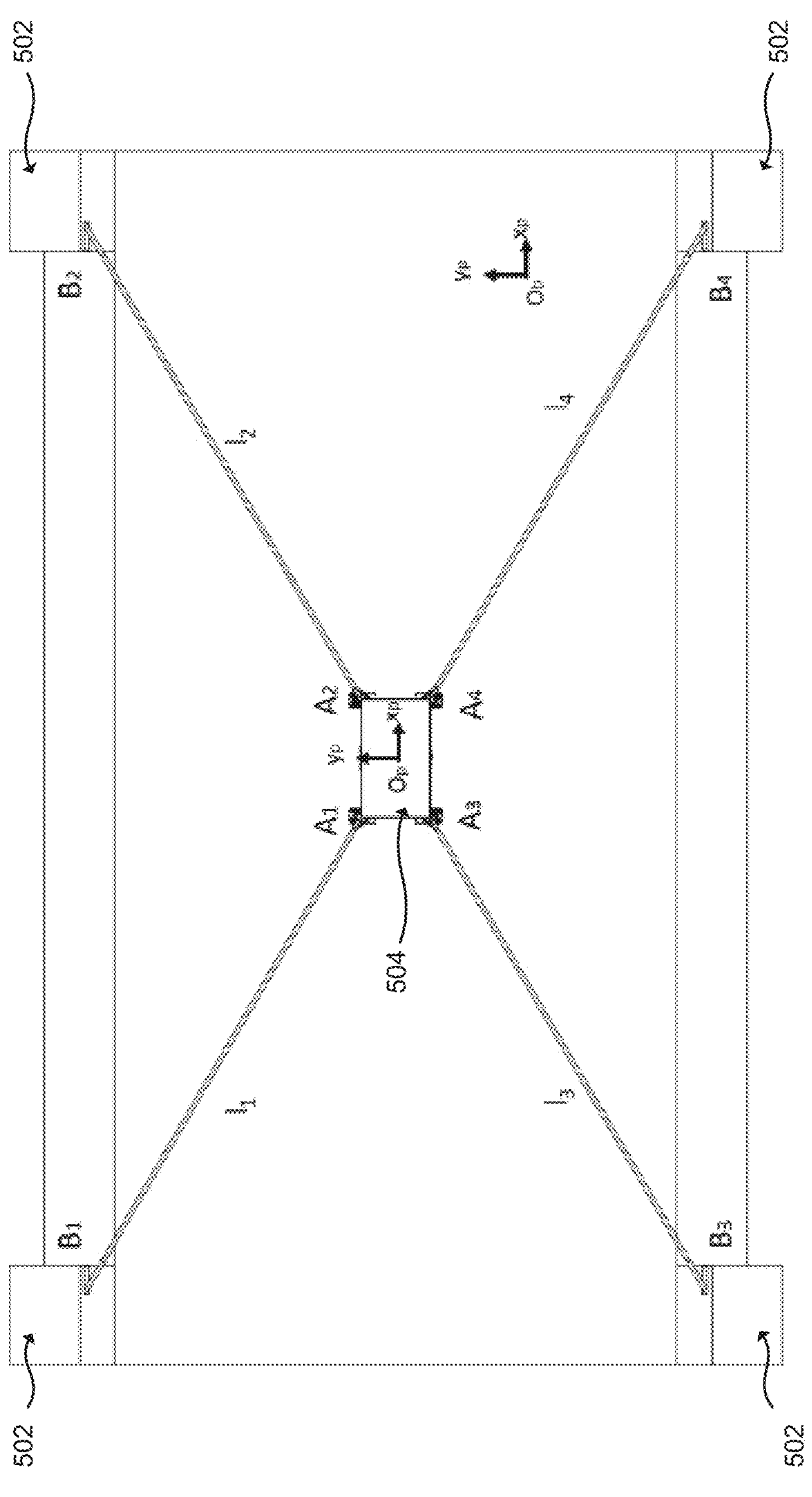
FIGS. 8 and 9 depict the systems of an externally actuated multi-cable driven device and an externally actuated uni-cable driven device, respectively.
Figure 9:
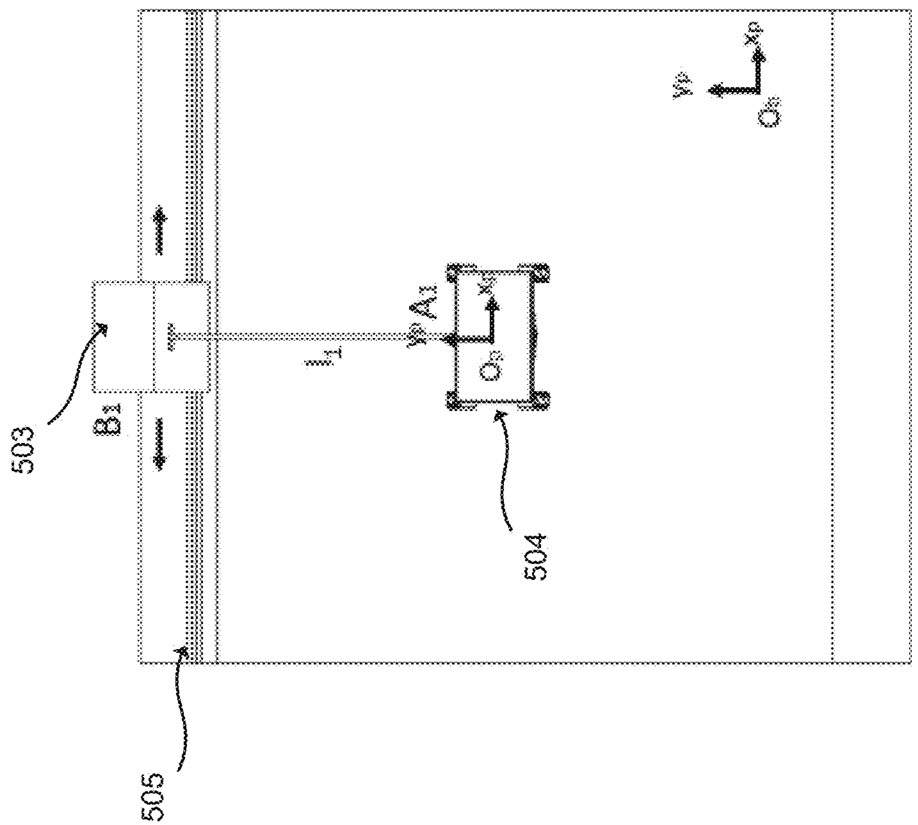

FIGS. 8 and 9 depict the systems of the externally actuated multi-cable driven device 500 and the externally actuated uni-cable driven device 500, respectively. The length between the body 504 and the cables 506, and the tension of the cables 506 is automatically adjusted using a control system such as control PCs. It will be appreciated that the control PCs are computing or embedded devices dedicated to monitoring the state of the system and control its motion. The control PCs are used to communicate with and control the pulley systems in order to move the body 504 on the surface or within the area. The control PCs are also used to apply the appropriate tension or force to the cables and to apply the appropriate pressure to the surface for a particular application of the body 504.

Similar to the device 200, the control PC may store a program for controlling the device 500, or the device 500 may be configured to receive signals from an off-board controller in, for example an external PC, for controlling the device 500. The control signals received from the off-board controller or from the stored program are configured to cause the motor drivers to actuate the motors 710. This allows for each of the cables 506 to be shortened or lengthened, and for an appropriate tension or force to be applied to each of the cables 506.

In order to move, for example tangentially to a curved surface, and maintain contact within the workspace, an adaptive control method is used. The adaptive control method may be calibrated prior to any services being performed by the device 500. The calibration may be done using limit switches. The calibration cycle comprises maintaining tension on all cables 506 whilst actuating one cable at a time. This allows for each cable length to be measured. In addition, the angles of the cables 506 relative to one or more axes of the body 504 may be determined. To determine the cable angles, guiding pulleys attached to encoders 716 may be used. The guiding pulleys and encoders 716 may be part of the system to provide more accurate measurements of the cable lengths. It will be appreciated that in some embodiments, an external motion capture system may instead be used for determining the position of the device 500.

Once calibration is complete, the external PC or the stored program determines how to mobilise the body 504 by actuating each of the cables 506 independently to achieve the motion. To maintain tension on all cables, a system model may be used based on a parallel cable mechanism to move all the cables proportionally to achieve the desired motion.

Referring to FIGS. 8 and 9, similar to FIG. 4, the position and orientation of the device 200 is given by vector $[p, \theta]^T$ which is relative to $F_b$, where $p=[p_x, p_y, p_z]$ and $\theta=[\alpha, \beta, \gamma]$. It will be appreciated that the cable lengths vector is $l=[l_1, l_2, l_3, \ldots, l_m]$ and the cable tensions vector is $\tau=[\tau_1, \tau_2, \tau_3, \ldots, \tau_m]$, where m is the total number of cables.

The base frame is denoted as $F_b$, which is attached to a rigid structure, and the moving platform frame denoted as $F_p$, which is attached to the device with origins $O_b$ and $O_p$, respectively. The points of attachment between the cables 506 and the rigid structure (for example, the fixtures) are denoted as $A_i$ which is fixed relative to the base frame. The attachment points between the cables 506 and the body 504 are denoted as $B_i$ which are a fixed distance away from $F_p$. Vector $$a_i^b$$

represents the position vector of point $A_i$ expressed in the base frame, and vector $$b_i^p$$

iS the position vector on point $B_i$ expressed in the device's frame. Although the z-axis is not depicted in FIG. 9, it will be appreciated that in embodiments where the device is connected to fixtures on more than one surface, the device 500 may be moved in the x-, y-, and/or z-axis.

Prior to any actuation by the device 500, the connections 502 are anchored to the fixtures in the environment. The change in cable lengths by the winches displaces the device about the area.

Referring to FIG. 9, the system of the uni-cable driven device 500 is depicted. It will be appreciated that the connection point 502 of the uni-cable driven device 500 may instead be a guide unit 503. The guide unit 503 comprises all of the components of the guiding system at connection points 502, and further comprises elements for moving horizontally along an elongated member, such as a guide rail 505. The elongated member or guide rail 505 may be secured to the surface prior to the device being positioned in the area. This allows the uni-cable driven device 500 to move the body 504 vertically by actuating the motors 710, and horizontally by moving along the guide rail 505.

The guide rail 505 is attached or secured to the building or structure and provides a path for the guide unit 503 to move along. The guide rail 505 may be straight or may be curved to match the curvature of the building or structure. This allows the device 500 to move along the surface while maintaining contact with the surface at all times. The motor 710 and the motor driver may be used for moving the guide unit 503 along the rail 505, or there may be additional motors and motor drivers for moving the guide unit 503 along the rail 505. The motor drivers receive signals from the control system for actuating the motors to move the guide unit 503 along the rail 505 into the desired positions for the service or operation.

In device 200 and multi-cable driven device 500, it will be appreciated that multiple cables are used to ensure stable positioning of the body 204, 504 on the surface, enabling both vertical and horizontal movements of the body 204, 504. The number of cables 206, 506 for the cable driven device may be determined based on the geometry of the surface for the surface operation. The surface geometry can dictate the minimum number of degrees of freedom for the cable driven device. This allows the number of actuators, pulleys, and anchor points on the surface to be determined to achieve full coverage of the surface within a desired workspace. For an n degree of freedom cable-driven system, m=n+1 actuators are needed. It will be appreciated that in over-actuated cable-driven systems where m≥n+1, the actuator power requirements can be reduced due to load sharing, which in turn can reduce costs.

In the system of FIG. 1, it will be appreciated that there are 3 degrees of freedom. This means that there are 4 pulleys each with an actuator and a motor (m=3+1). For surfaces with more complex geometries, there may be more degrees of freedom, which would result in additional pulleys and cables for the cable driven device.

FIGS. 10*a*-10*d* depict a uni-cable driven device 500 positioned over curved surfaces, and FIGS. 11*a*-11*c* depict a multi-cable driven device 500 positioned over curved surfaces. Although, the device 200 is not depicted, it will be appreciated that the device 200 can also be used to perform services or operations on curved or irregular surfaces. As depicted in FIGS. 10*a*-10*d* and 11*a*-11*c*, the body 504 maintains contact with the surface while being connected to the surface via one or more connection points 502.

The surface of the workspace may be a curved surface as depicted, or may be another irregularly shaped surface with grooves or ridges. The cable and pulley system of devices 200, 500 is configured to move the body 204, 504 on such irregularly shaped and geometrically complex surfaces to ensure the service or operation is accurately and properly performed. This system allows the body 204, 504 to adjust to uneven surfaces with sudden changes in material type and elevation.

Figure 12:
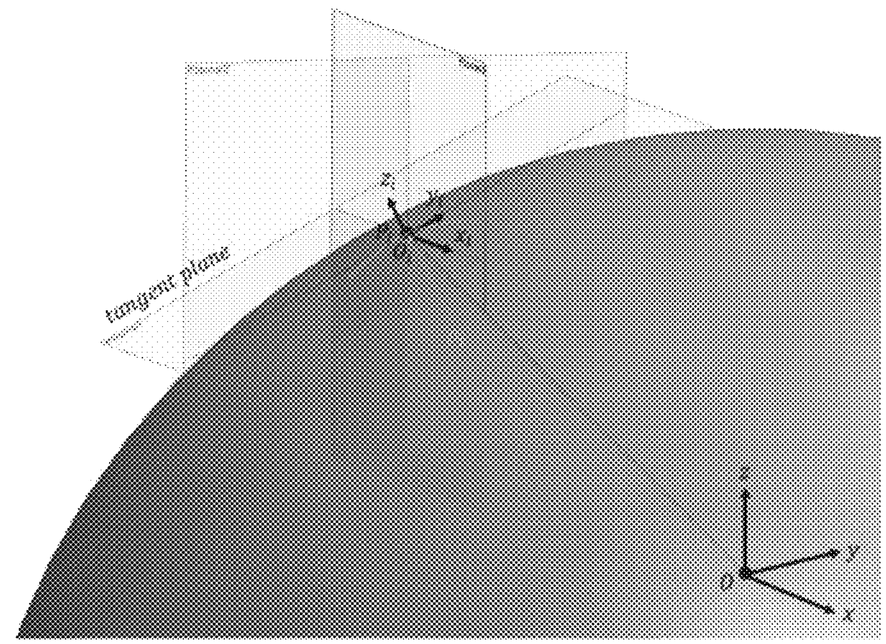
FIG. 12 depicts a curved surface point model of the cable-driven system for devices.

FIG. 12 depicts a curved surface point model of the cable-driven system for the devices 200, 500. The body or end effector 204, 504 will move tangentially to the surface, maintaining contact with the surface throughout the surface operation within its workspace. The position of the body or end effector 204, 504 can be specified with respect to a global coordinate system ($O_{xyz}$). The position of the body or end-effector is defined as $P_i$ with a local curvature $1/\rho_i$ of the surface where $\rho_i$ is the radius of the curvature.

It will be appreciated that at any point $P_i$ on the surface, a tangent plane that is perpendicular to the curvature radius and intersects with point $P_i$ is defined. This frame is defined as $O_{ixyizi}$ where $O_i=P_i$. Note that z points radially along the curvature radius extruded from the surface.

If the surface or space for the service or operation to be performed is large, the surface or space may be divided into multiple areas, with multiple fixtures or supports for each area. For example, there may be additional fixtures above, below, or beside the fixtures depicted. The cable-driven device 200, 500 can be moved from one area to another, connecting to the respective fixtures for the particular area each time. It will be appreciated that there may be one cable driven device that is moved from area to area to perform the services or operations on the whole surface or space, or there may be multiple cable driven devices that can be used for one or more of the areas requiring service or operation.

Figure 13:
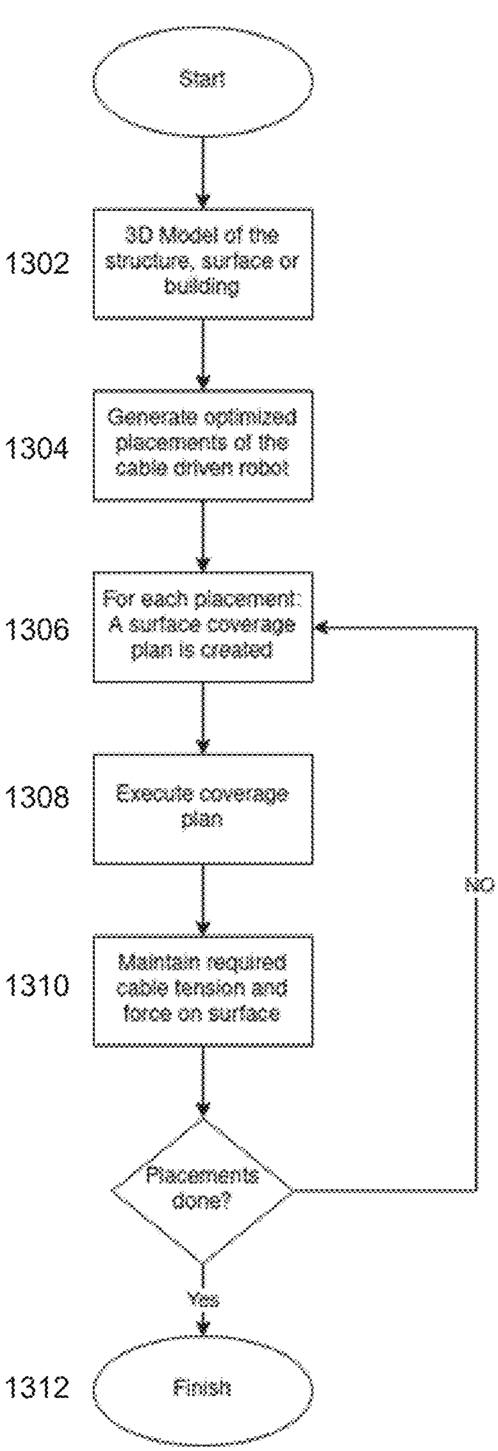
FIG. 13 depicts a method of executing an autonomous surface operation by the cable-driven system of the devices.

FIG. 13 depicts a method of executing an autonomous surface operation by the cable-driven system of devices 200, 500. A 3D model of the surface of the building, tower, or bridge is provided (1302), which is used to generate optimized placements of the cable-driven system (1304). The optimized placements may correspond with the fixtures at anchor points on the one or more surfaces, or the optimized placements may be determined, and then fixtures may be added to the one or more surfaces at each of the determined placements. It will be appreciated that there may be only one optimized placement if there is only a small surface area for the surface operation, or if the surface does not have complex geometry. There may be multiple placements for larger surface areas and/or for buildings with complex geometries or irregular surfaces. For each placement, a surface coverage plan is created (1306). The coverage plan is used to systematically navigate the surface area of the placement to cover every part of it according to predefined parameters. The predefined parameters may be the required force of the body 204, 504 on the surface, the tension in the cables 206, 506, etc. The coverage plan is executed (1308), to move the body 204, 504 over the surface of the building to ensure proper coverage. The tension in the cables and the force or pressure on the surface are maintained for the surface operation of the placement (1310). Once surface operation for the placement is completed, the cable driven device 200, 500 may be moved to a new placement where another set of anchor positions is installed on the surface, to cover all areas of interest on the building. Once all placements have received surface operation, the system is finished (1312).

If all of the placements are not yet completed, once the system is moved to the next placement, a surface coverage plan is created (1306) for said next placement and is executed (1308).

It will be appreciated that, in the method, the control system of the devices 200, 500 is a centralized computing device running a real-time control algorithm that gathers information about the state of the system and decides on how to mobilise the body 204, 504 by actuating each of the cables independently to achieve the motion.

The cable driven systems described herein are parallel cable driven systems that perform services or operations on various different surface geometries and spaces. The system connects to fixtures on one or more surfaces, with a body that may be in contact with a surface throughout the service or operation, and cables connecting the body to the fixtures. It will be appreciated that the internally actuated cable-driven device 200 may provide a greater range of motion in a space or on a surface, and may handle large payloads even with the added weight on the body 204. The externally actuated uni-cable driven device 500 may have a limited range of motion as only one cable 506 is used, and may be used for more simple services or operations on surfaces with less obstacles. The externally actuated multi-cable driven device 500 allows for a good range of motion, and may be used on more complex surfaces with obstacles and other irregularities. The elements of the systems allow for the devices to have high position accuracy, with less energy being consumed. The number of pulleys and cables and the placement of connection points allows for more complex surface geometries to receive different services and operations. The cable-driven devices may be light-weight and allow for an easy to set up with the connections removably connecting to fixtures or supports. The devices may be able to lift high payloads and perform the service or operation over small and large workspaces.

In some embodiments, the body 204, 504 further comprises sensors. The sensors and system of the devices may be configured to measure and report humidity readings, wind speed and direction, and the cable tension before, during, and/or after the service or operation. For some applications, the sensors and system may be further configured to measure the force of the body or attachment on the surface. There may be one or more sensors on the body 204, 504 to provide readings, measurements and/or images for the humidity readings, wind speed and direction, the cable tension, and/or other factors.

The cables may be formed of, for example, Zylon™ or Dyneema™ which have high breaking loads, or may be formed of another material such as carbon or steel with lower breaking loads. The material and lengths of the cables are selected to prevent any breakage of the cables under tension by the pulleys and under the force of gravity.

As described above, the body 204, 504 may comprise an attachment to perform the particular surface operation required for the surface. For example, the attachment may perform non-destructive testing (NDT) inspection, cleaning, painting, scanning, coating, wiping, or other operations for the surface or area. An attachment or end-effector may be a sensor, gripper, scanner, camera, or other attachment for providing the service. A painting attachment may comprise paint brushes or rolls for contacting a surface. A coating attachment may coat a surface with, for example a hydrophobic coating. The end-effector may be tailored to the service required. In addition, it will be appreciated that the device and system may be used for other applications such as: rehabilitation aid, 3D printing, or filming.

Depending on the application of the devices 200, 500, the position and tension of the cables may be configured to prevent the body and cables from contacting the surface, or may be configured to apply a predetermined pressure to the surface. The fixtures and connection points may be similarly positioned and configured for the particular application. The device 200, 500 may further comprise a hose, other tubing, or connection for a hose or other tubing for providing water, soap, or other elements to the particular attachment.

It will be apparent to persons skilled in the art that a number of variations and modifications can be made without departing from the scope of the invention. Although specific embodiments are described herein, it will be appreciated that modifications may be made to the embodiments without departing from the scope of the current teachings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as described herein.

What is claimed is:

1. A device for performing a service on a surface, the device comprising:

a plurality of cables removably coupled to the surface for the service, each of the plurality of cables removably coupled at a different position on the surface;

a body coupled to the plurality of cables at an intersection of the plurality of cables; and a plurality of pulley systems configured to automatically adjust a length of each cable of the plurality of cables between the respective position on the surface and the body such that a tension in each cable is maintained to move the body on the surface, wherein the surface is a curved surface or a surface with complex geometry and the body of the device is configured to move tangentially to the curved surface or surface with complex geometry.

2. The device of claim 1, wherein a number of the plurality of cables is determined based on a geometry of the surface.

3. The device of claim 1, wherein the plurality of pulley systems are positioned within the body and wherein each cable of the plurality of cables is coupled to a respective pulley system of the plurality of pulley systems.

4. The device of claim 1, wherein each pulley system of the plurality of pulley systems is positioned at the respective position on the surface and wherein each cable of the plurality of cables is coupled to a respective pulley system.

5. The device of claim 1, wherein each pulley system of the plurality of pulley systems comprises a motor and a pulley, the pulley being configured to adjust the length between the respective position on the surface and the body.

6. The device of claim 1, wherein the body comprises an attachment for performing the service.

7. The device of claim 1, further comprising circuitry configured to:

automatically adjust the length of each cable of the plurality of cables between the respective position on the surface and the body to move the body on the surface; and maintain the tension in each of the plurality of cables to maintain a position of the body relative to the surface.

8. The device of claim 4, wherein the body further comprises:

wheels for moving the body on the surface; and a suspension system for the wheels for moving the body across irregularities on the surface.

9. A device for performing a service on a surface, the device comprising:

at least one cable removably coupled to a surface, each of the at least one cable removably coupled at a different position on the surface;

a body coupled to the at least one cable and in contact with the surface; and at least one pulley system configured to automatically adjust a length of each of the at least one cable between the respective position on the surface and the body such that a tension in each of the at least one cable is maintained to move the body on the surface, wherein the surface is a curved surface or a surface with complex geometry and the body of the device is configured to move tangentially to the curved surface or surface with complex geometry.

10. The device of claim 9, wherein the device comprises one cable coupled to the surface via a guide unit, the guide unit comprising one pulley system, and the cable being coupled to a pulley of the pulley system.

11. The device of claim 10, further comprising an elongated member for guiding the guide unit across the surface, the guide unit being slidably coupled to the elongated member.

12. The device of claim 11, further comprising circuitry configured to:

automatically adjust the length of the cable between the elongated member and the body to move the body on the surface; and actuate a motor of the guide unit to move the guide unit along the elongated member.

13. The device of claim 10, wherein the body comprises an attachment for performing the service.

14. A system for performing a service on a surface, the system comprising:

a cable driven device comprising:

a plurality of cables configured to removably couple to a surface, each of the plurality of cables configured to removably couple to the surface at a different position on the surface; and a body configured to perform the service and coupled to the plurality of cables at an intersection of the plurality of cables; and a processor configured to:

automatically adjust a length of each cable of the plurality of cables between the respective position on the surface and the body; and maintain a tension in each cable of the plurality of cables, wherein the surface is a curved surface or on a surface with complex geometry and the body of the device is configured to move tangentially to the curved surface or surface with complex geometry.

15. A method of performing a service on a curved surface or a surface with complex geometry, the method comprising:

providing a model of the surface;

generating one or more placements of a cable driven device on the surface, and for each placement creating a surface coverage plan;

performing, by the cable driven device, the service based on the surface coverage plan of the one or more placements; and during the performing, automatically adjusting a length of cables of the cable driven device and maintaining a tension in the cables of the cable driven device based on predefined parameters of the device such that during the performing, a body of the device moves tangentially to the curved surface or surface with complex geometry, wherein the cables are removably coupled to the surface, each of the cables is removably coupled to the surface at a different position on the surface.

16. The method of claim 15, wherein the cable driven device comprises the body for performing the service, the cables for connecting to the surface and to the body, and pulley systems for adjusting the length of the cables and maintaining the tension in the cables.

17. The method of claim 16, further comprising receiving signals from a controller, the signals indicating an adjustment of each of the cables.

18. The method of claim 16, wherein the predefined parameters are at least one of a force of the body on the surface for the service, a tension in each of the cables to maintain the body on the surface, and an attachment on the body for performing the service.

* * * * *